United States Patent
Lamb

[15] 3,699,813
[45] Oct. 24, 1972

[54] MEDICAL THERMOGRAPHIC DIAGNOSTIC MEANS

[72] Inventor: Anthony H. Lamb, 66 King Street, Hillside, N.J. 07205

[22] Filed: May 25, 1970

[21] Appl. No.: 40,094

[52] U.S. Cl. .............. 73/342, 73/343.5, 73/362 AR, 128/2 H
[51] Int. Cl. .............................................. G01k 7/24
[58] Field of Search .............. 73/342, 362 AR, 343.5; 128/2 H

[56] References Cited

UNITED STATES PATENTS

| | | |
|---|---|---|
| 2,971,379 | 2/1961 | Weisheit ............... 73/362 AR |
| 3,485,102 | 12/1969 | Glick ..................... 73/362 AR |
| 2,547,625 | 4/1951 | Corson .................. 73/362 AR |
| 2,900,820 | 8/1959 | Serafin ......................... 73/342 |
| 3,377,862 | 4/1968 | Gheorghiu ............ 73/362 AR |
| 3,402,378 | 9/1968 | Catlin ................. 73/362 AR X |
| 3,512,167 | 5/1970 | Weinstein ............. 73/343.5 X |
| 2,282,442 | 5/1942 | Whitlock ........... 73/362 AR X |
| 3,211,000 | 10/1965 | Childs .......................... 73/342 |
| 3,339,542 | 9/1967 | Howell ..................... 73/340 X |
| 3,651,694 | 3/1972 | Lamb .......................... 73/342 |

*Primary Examiner*—Louis R. Prince
*Assistant Examiner*—Frederick Shoon
*Attorney*—Rudolph J. Jurick

[57] ABSTRACT

Temperature-sensitive elements, adapted for contact with selected areas of the human body, are connectable into a bridge circuit and effect the actuation of an indicator having a scale calibrated in predetermined temperature values. Circuit arrangements are provided for measuring and recording the temperature of individual temperature sensitive elements and the temperature difference between such elements, thereby to facilitate obtaining diagnostic temperature information of an individual and, also, to provide for a rapid temperature checking of individuals on a mass basis.

11 Claims, 17 Drawing Figures

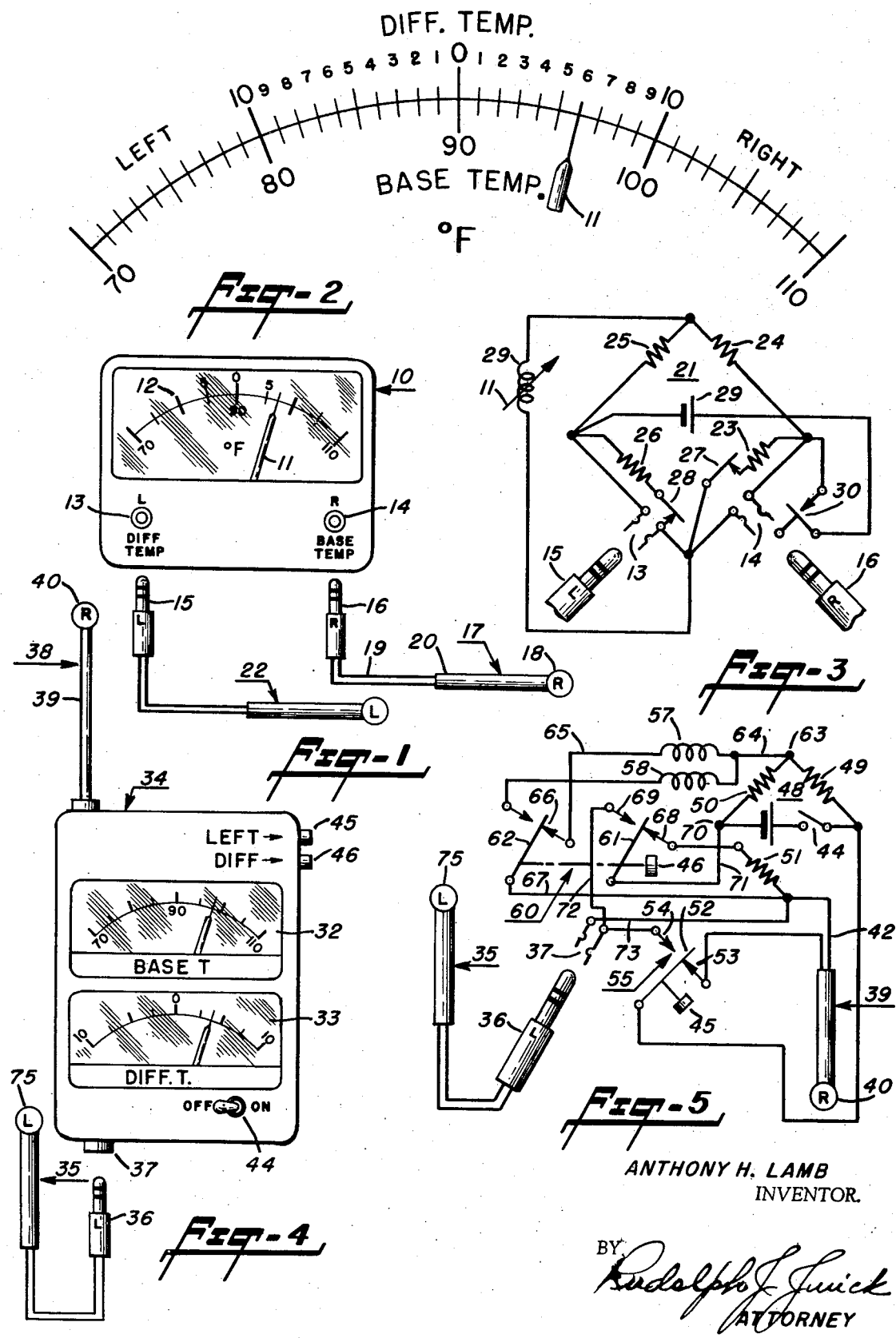

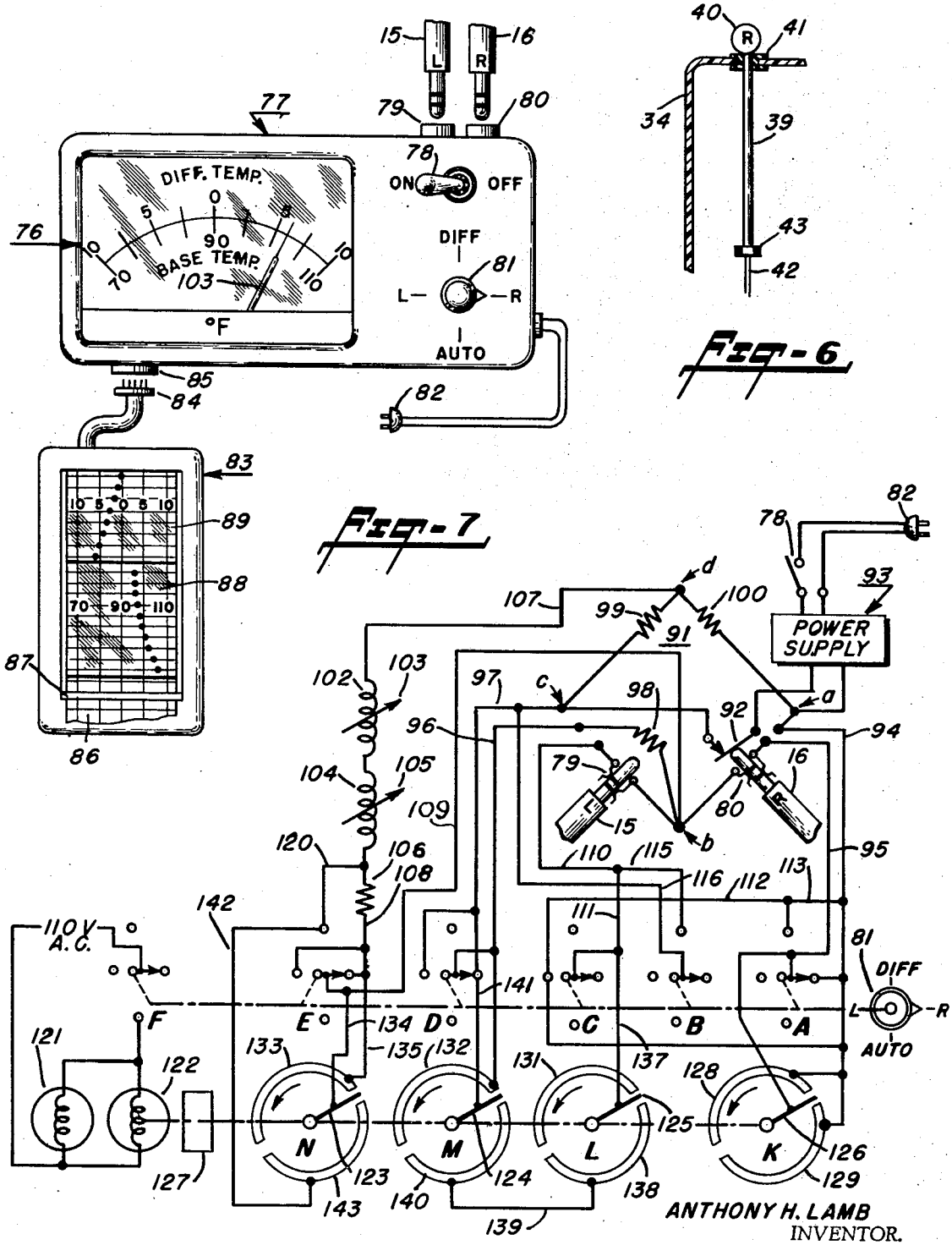

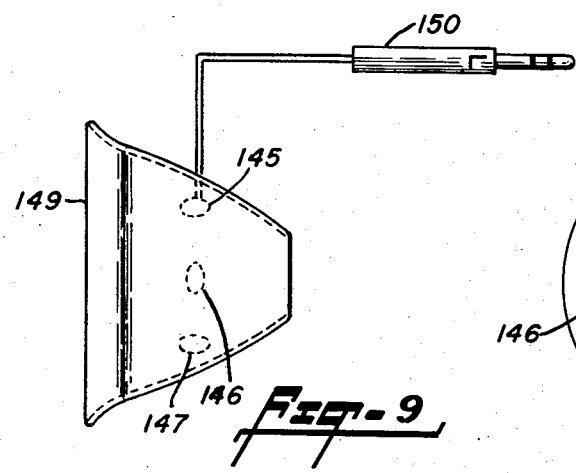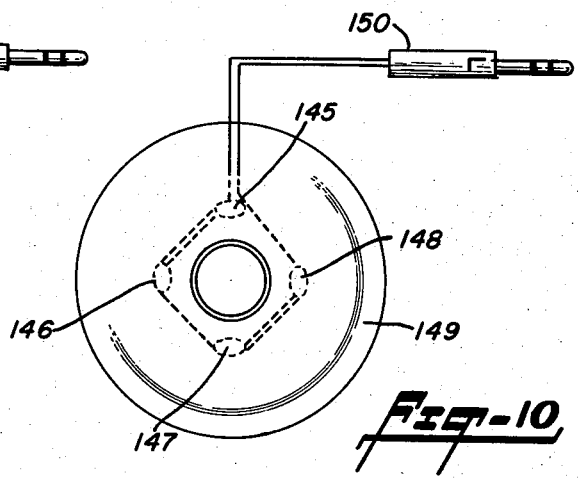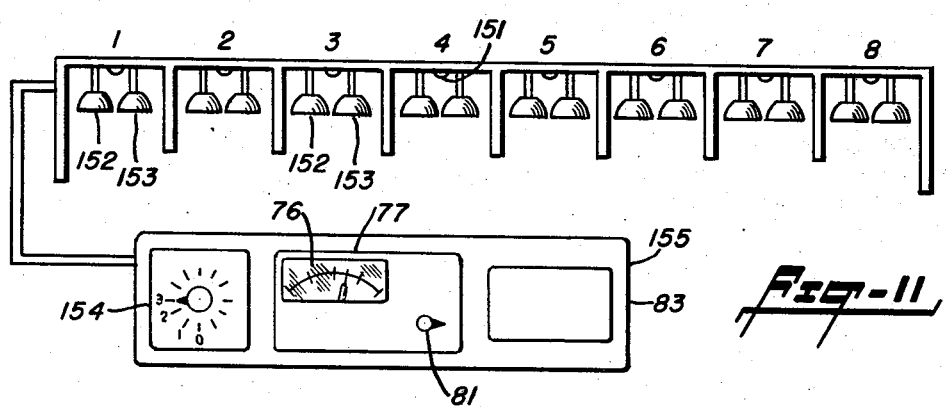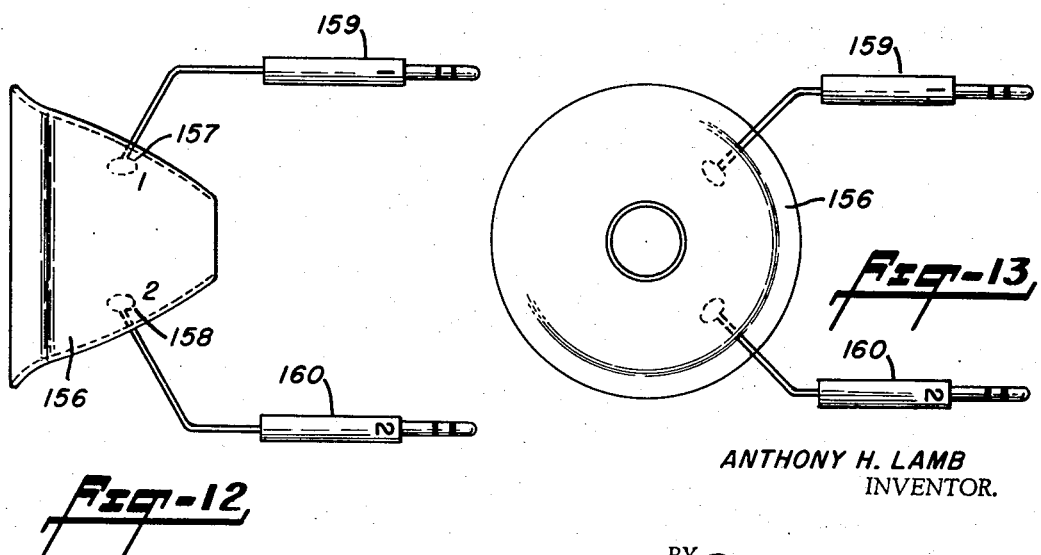

ANTHONY H. LAMB
INVENTOR.

BY Rudolph J. Junick
ATTORNEY

MEDICAL THERMOGRAPHIC DIAGNOSTIC MEANS

BACKGROUND OF THE INVENTION

It is known that a difference in skin temperature between corresponding, opposite zones of the human body may be taken as indicative of disease located in the zone having a higher or lower than normal temperature. Generally, the skin temperature at the affected area will vary from 1° to 10°F above or below normal temperature, depending upon the area of the body being investigated and the severity of the disease. Thermographic means and methods are known for locating elevated temperature areas on the body. In one such arrangement, infrared radiation from the body is detected by a scanning method, and converted to a photograph. In another such arrangement, the body is coated with a phosphor which is excited to luminescence with ultraviolet radiation and a thermal pattern is displayed on a television tube. In these arrangements, the equipment is bulky, expensive and is effectively used only by highly trained personnel. Furthermore, the patient must be brought to the equipment. Consequently, such arrangements are not adapted for widespread use or for rapid mass surveys.

The apparatus herein disclosed is relatively inexpensive and is particularly adapted for easy, rapid and, uncomplicated use by busy doctors, nurses and clinical workers.

SUMMARY OF THE INVENTION

Temperature-sensitive elements are plug-connectable to a bridge circuit disposed in an electrical instrument having a pointer movable over a scale calibrated in temperature values. The probes are adapted to be placed into contact with selected areas of the body and switch means are provided whereby the instrument provides a measure of the base temperature or the differential temperature of the contacted areas. Such temperatures may be recorded on a chart carrying alternate zones calibrated in base and differential temperatures, whereby the apparatus is adapted for making rapid temperature records in mass surveys.

An object of this invention is the provision of an improved diagnostic aid in the detection of body disorders which exhibit temperature variations from normal.

An object of this invention is the provision of an arrangement for accurately measuring the base temperature of a selected area of a body and the temperature difference between two areas of the body.

An object of this invention is the provision of apparatus for making measurements of body temperatures on a mass survey basis.

The above-stated and other objects and advantages of the invention will become apparent from the following description when taken with the accompanying drawings, it being understood however, that the drawings are for purposes of illustration and are not to be construed as defining the scope or limits of the invention.

BRIEF DESCRIPTION OF DRAWINGS

In the drawings wherein like reference numerals denote like parts in the several views:

FIG. 1 is a front elevational view of apparatus made in accordance with one embodiment of this invention;

FIG. 2 is an enlarged view of the calibrated scale;

FIG. 3 is a circuit diagram of the apparatus;

FIG. 4 is a front elevational view of apparatus made in accordance with another embodiment of this invention;

FIG. 5 is a circuit diagram thereof;

FIG. 6 is a fragmentary sectional view showing the probe of FIG. 4 in the retracted position;

FIG. 7 is a front elevational view of apparatus made in accordance with still another embodiment of this invention;

FIG. 8 is a circuit diagram thereof;

FIG. 9 is a side elevational view of cup-like device for supporting temperature sensing elements in operative position on a female breast;

FIG. 10 is a front elevational view thereof;

FIG. 11 is a diagrammatic representation of an arrangement for making rapid temperature checks of female breasts on a mass survey basis, FIGS. 12 and 13 are side and front elevational views of a cup-like device for use in checking the temperature of adjacent quadrants of a female breast;

DESCRIPTION OF PREFERRED EMBODIMENTS

Figure 14:
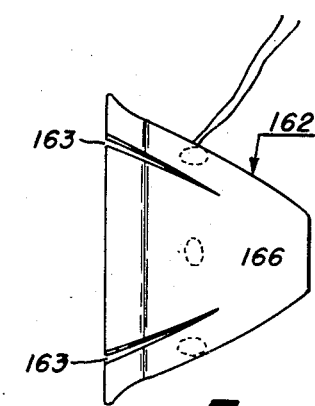
FIGS. 14 and 15 are side and front elevational views showing a modification of the cup-like device.

Referring to FIG. 1, there is shown an electrical instrument 10 having a pointer 11 movable along a scale 12 calibrated in temperature values. The instrument is provided with sockets 13 and 14 for receiving conventional connector plugs 15 and 16, which plugs carry identifying markings as, for example, the letters L and R corresponding to the similar markings associated with the sockets. A first probe 17 comprises a temperature-sensitive element such as, for example, a thermistor, encased within a small, flat disc 18 made of a material having good thermal conductivity. The disc, which may also be marked with the letter R, is adapted for flush contact with a selected area of the human body. The thermistor is connected to flexible leads 19, which leads pass through a tube 20 and are connected to the plug 16, said tube forming a convenient handle to facilitate placing the disc in contact with a selected area of the human body. A similar probe 22 is connected to the connector plug 15. When the plug 16 is inserted into the socket 14 the temperature of the probe disc 18 is indicated by the position of the instrument pointer relative to the scale identified by the legend BASE TEMP. as shown in the enlarged view of the scale, FIG. 2. When both of the connector plugs are inserted into the associated sockets, the temperature difference between the probe discs is indicated by the position of the pointer relative to scale identified by the legend DIFF. TEMP. Under this condition, the position of the pointer shown in FIG. 2 indicates that the temperature of the R probe is 6°F higher than the L probe.

The circuit of the instrument, shown in FIG. 3, includes a Wheatstone bridge 21 comprising the four resistors 23–26 made of wire or other material having a zero temperature coefficient of resistance. The resistors 23 and 26 normally are connected in adjacent arms of the bridge through the normally-closed switches 27 and 28, and the ohmic values of the bridge resistors are selected so that when the bridge is energized by the battery 29, the bridge will be unbalanced to a predetermined extent. This unbalanced condition of the bridge results in a bridge output voltage applied to the movable coil 29 (of the instrument 10, FIG. 1), whereby the instrument pointer deflects upscale into alignment with a predetermined scale mark, say, the top, 110°F mark. The thermistors connected to the plugs 15 and 16 have matched temperature coefficients of resistance and the ohmic values thereof are selected to balance the bridge when the thermistors are subjected to the same temperature. When the connector plug 16 is partially inserted into its socket 14, it closes the normally-open switch 30 resulting in the energization of the bridge, whereby the instrument pointer will deflect into alignment with the top scale mark, thereby indicating the electrical circuit is in proper operating condition. When the plug is fully inserted into its socket, the associated thermistor is connected across the adjacent bridge junctions through the contacts of the socket and, at the same time, the end of the plug opens the normally-closed switch 27. It will be apparent, therefore that the thermistor now replaces the bridge resistor 23. Under this condition, the output voltage of the bridge varies with the resistance of the thermistor and the temperature of the thermistor is read directly from the BASE TEMP. scale (FIG. 2). When the connector plug 15 is inserted into its socket 14, the switch 28, is opened and the thermistor connected to this plug replaces the resistor 26 as an arm of the bridge. The magnitude of the bridge output voltage will now vary in correspondence with the difference in temperature between the two thermistors and such differences temperature is read directly from the DIFF. TEMP. scale.

Reference now is made to FIG. 4 showing another embodiment of the invention. Here, two indicating instruments 32 and 33 are contained within a case 34 of a size convenient for carrying in ones pocket, the instrument 32 having a base temperature scale calibrated 70° – 110°F and the instrument 33 has a differential scale calibrated 10 – 0 – 10°F. The L temperature probe 35 (similar to the probe 22 shown in FIG. 1), is connectable into the circuit disposed in the case 34 by means of the connector plug 36 and socket 37. The other, R probe 38 comprises the rod 39 terminating in a flat disc 40 carrying a thermistor. As shown in the fragmentary sectional view of FIG. 6, the rod 39 passes through a rubber grommet 41 and the flexible leads 42 serve as the means for connecting the thermistor to the electrical circuit. Thus, the probe may be extended to the position shown in FIG. 4 for the purpose of making a temperature measurement, or the probe may be depressed to the retracted position shown in FIG. 6 when the instrument is carried in the pocket. A collar 43, secured to the rod 39, FIG. 6, limits the extent to which the probe can be extended from the case 34. An on-off switch 44 is carried by the front wall of the case and a pair of push-buttons 45 and 46 are carried by the side wall of the case. With the probe 38 in the extended position, movement of the switch 44 to the 'on' position conditions the instrument for the measurement of a body area contacted by the disc 40, such temperature being indicated on the scale of the upper instrument 32, irrespective of whether the connector plug 36 is or is not inserted into the socket 37. Assuming now, that the connector plug 36 is inserted into the socket 37, the depression of the push-button 45 actuates a switch which alters the circuit so that the instrument 32 indicates the temperature of the probe 35, whereas depression of the push-button 46 alters the circuit so that the instrument 32 indicates the temperature of the probe 38 and, simultaneously, the instrument 33 indicates the temperature difference between the two probes.

The circuit diagram of the instrument is shown in FIG. 5. The bridge 48 comprises the three fixed resistors 49, 50 and 51 and the probe 39, said probe being connected to adjacent junctions of the bridge by the flexible leads 42 and the normally-closed contacts 52, 53 of a switch 55 which switch is actuated by means of the push-button 45. The probe 35 is connectable to the same bridge junctions through the contacts of the socket 37 and the normally-open contacts 52 and 53 of the switch 55. Thus, when the push-button 45 is depressed, the opening of the switch contacts 52 and 53 disconnects the probe 39 from the bridge and the closure of the switch contacts 52 and 54 connects the probe 35 to the bridge. The movable coils of the instruments 32 and 33 (FIG. 4) are identified in FIG. 5 by the numerals 57 and 58, respectively. One or the other of these movable coils are connected to the output junctions of the bridge by means of the switch 60 having a pair of movable contacts 61 and 62 simultaneously actuated by the push-button 46. With the switch 60 in the illustrated normal position, only the movable coil 57 is connected to the bridge output junctions, the circuit being traced as follows: output junction 63, lead 64, movable coil 57, lead 65, closed switch contacts 62, 66 and lead 67. The bridge is energized by closure of the on-off switch 44, whereby the temperature of the probe 39 is indicated by the instrument 32. Upon depressing the push-button 45, this instrument indicates the temperature of the L probe 35. With the switch 85 in the illustrated, normal position, depression of the push-button 46 transfers the movable contacts of the switch 60 out of engagement with their associated back contacts and into engagement with their associated front contacts. Under this condition, the opening of the switch contacts 61, 68 removes the fixed resistor 51 from the bridge circuit and the closure of the switch-contacts 61, 69 substitutes the probe 35 for the disconnected resistor 51, the latter circuit being traced as follows; bridge junction 70, lead 71, closed switch contacts 61, 69, lead 72, the thermistor carried by the probe disc 75 and connected across the contacts of the socket 37, and the lead 73. In use, the instrument, FIG. 4, is held in the right hand and the disc 40 placed into contact with a selected area of the body, while the probe 35, held in the left hand, is placed into engagement with another selected area of the body. The push-buttons 45 and 46 are conveniently operable by the thumb of the right hand. The base temperature of one or the other selected areas of the body is indicated by the instrument 32 by operation of the push-button 45. The temperature difference between the selected areas is indicated by the instrument 33 upon depression of the push-button 46.

Reference now is made to FIG. 7 showing another embodiment of the invention. The indicating instrument 76 is carried by a case 77, said instrument being provided with a dual-calibrated scale. The case carries an on-off switch 78 and a pair of sockets 79 and 80 for receiving the connector plugs 15 and 16, said plugs being connected to the probes 17 and 22 shown in FIG. 1. Disposed within the case is a 6-deck rotary switch provided with an operating knob 81. The electrical circuit, contained within the case 77, is energized upon inserting the connector plug 82 into an outlet socket and the closure of the on-off switch 78. A strip chart recorder 83 is connectable to the circuit by inserting a multi-contact plug 84 into the socket 85. The recorder is of conventional construction and periodically marks a dot on the chart 86 calibrated in temperature values, the lower portion of the chart passing outwardly of the recorder case through a slot formed under a tear plate 87, whereby any desired length of the printed chart may be separated from the remainder of the chart by the user. For use in the present invention, the chart is divided into alternate zones 88 and 89. The chart zones 88 are calibrated in base temperature values within a range of 70° − 110°F, whereas the chart zones 89 are calibrated in differential temperature values within a range of 10° − 0° − 10°F. When the knob 81 is set to the R (right), L (left) or DIFF. (differential) position, the instrument 76 will indicate, respectively, the base temperature of the left probe, the base temperature of the right probe, and the temperature difference between the two probes. When the knob 81 is set to the AUTO. (automatic) position, a sequencing arrangement causes the instrument 76 to alternately indicate the base temperature of the right probe and the temperature difference between the probes, each such indication being retained for a predetermined time period. Such time periods correspond to the movement of the recorder chart from one to the other zone thereof, whereby the stated base and difference temperatures are recorded on the corresponding chart zones.

The circuit diagram of the apparatus is shown in FIG. 8 to which reference now is made. The L connector plug 15 and the R connector plug 16 each are shown connected to their respective sockets 79 and 80, said sockets being connected in adjacent arms of the bridge 91. The tip of the connector plug 16 closes the normally-open switch 92, whereby a d.c. energizing voltage is applied to the bridge input junctions, such voltage being obtained from a conventional power supply 93 upon closure of the on-off switch 78. The six decks of the manually-operable rotary switch are here identified by the letters A, B, C, D, E and F. When the switch-operating knob 81 is set to the illustrated R position, the switch deck A connects together the leads 94 and 95, thereby connecting the thermistor associated with the connector plug 16 between the bridge junctions $a$ and $b$. The switch decks B, C and F are of no effect as the movable contacts thereof are in engagement with dead stationary contacts. The switch deck D connects together the leads 96 and 97, thereby connecting the bridge resistor 98 across the bridge junctions $b$ and $c$. Under these conditions, the four bridge arms comprise the fixed resistors 98, 99 and 100 and the resistance of the thermistor associated with the connector plug 16, whereby the voltage appearing across the bridge output terminals $b$ and $d$ varies in magnitude in correspondence with the temperature of this thermistor. The instrument movable coil 102 (carrying the pointer 103), the recorder movable coil 104 (carrying the pointer 105) and the current-limiting resistor 106 are connected in series across the bridge output terminals, the circuit being traced as follows; lead 107, coils 102 and 104, resistor 106, lead 108, closed contacts of switch deck E and lead 109. Consequently, the instrument pointer is deflected along the scale and provides a direct reading of the temperature of the R (right) probe. The simultaneous deflection of the recorder pointer is of no effect as the recorder is not in operation under the conditions just described.

When the switch knob 81 is rotated 180° to the L position, the now-open contacts of the switch deck A disconnect the connector plug 16 from the bridge junction $a$ and the now-closed contacts of the switch deck C connect the connector plug 15 to this bridge junction, the circuit being traced as follows; leads 110 and 111, closed contacts of the switch deck C, and the leads 112 and 94. The remainder of the circuit remains unchanged by reason of the individual jumper leads connected across the left and right stationary contacts of these switch decks. Consequently, the meter 76 (FIG. 7) provides a direct reading of the temperature of the L (left) probe.

When the switch knob 81 is set to the vertical, (differential) position, the connector plug 16 again is connected to the bridge junction $a$ through the jumper lead 113. The bridge resistor 98 is disconnected from the bridge junction $c$ by reason of the open contacts of the switch deck D and this bridge resistor is replaced by the thermistor associated with the connector plug 15, the circuit being traced as follows; lead 110 and 115, closed contacts of switch deck B and the lead 116. At the same time, the current-limiting resistor 106 is removed from the bridge output circuit, thereby increasing the deflection of the movable coils 102 and 104 in response to a given bridge output voltage, the circuit being traced as follows; lead 107, movable coils 102 and 104, lead 120, now-closed contacts of switch deck E, and the lead 109. Under these conditions, the instrument 76 (FIG. 7) indicates differential temperature, that is, the difference in temperature between the two probes. The deflection characteristics of the movable coils 102 and 104, as well as the ohmic resistance of the coils and the current-limiting resistor 106 are so selected that when the bridge circuit is conditioned for the measurement of the temperature of either the R or the L probe, the pointers of the instrument 76 and the recorder 83 will be deflected over the full span of the associated scale in response to a bridge unbalance corresponding to 40°F. On the other hand, when the bridge circuit is conditioned for the measurement of differential temperatures the two pointers will be deflected over their full scale ranges in response to a bridge unbalance corresponding to 20°F. This automatic increase in the deflection characteristics of the instrument and recorder is desirable to facilitate the reading of differential temperatures.

As described to this point the apparatus shown in FIGS. 7 and 8 operates in a manually-controlled mode. Specifically, the operator determines the particular temperature measurements to be made by manipulation of the switch knob 81. The apparatus operates in an automatic mode by setting the knob 81 to the AUTO. position. Referring to FIG. 8, it will be noted that when the knob 81 is set to the AUTO. position all of the switch decks are disconnected from the circuit with the exception of deck F. The closure of the contacts of switch deck F energizes two synchronous motors 121 and 122. The motor 121 is in the recorder and, through conventional mechanisms, drives the recorder chart and operates a reciprocating bar to print the dots on the chart. The motor 122 drives the rotating contact arms 123–126 through a gear reducer 127. These arms are arranged for sliding engagement with arcuate fixed contacts to form a sequencing switch having four decks K, L, M and N. It will be assumed that the contact arms rotate at a speed of 1 RPM, that the recorder chart moves at a linear speed such that each chart zone is presented to the printing station of the recorder for a period of 30 seconds, and that the printing mechanism functions to print a dot on the chart every 6 seconds. It will be noted that the arcuate contacts of each of the decks K – N has an angular length somewhat less than 180° and that the contact arm does not span the space separating the arcuate contacts, thereby to prevent ambiguity of the temperature measurements as the arms rotate from one to the other of the associated arcuate contacts. The contact arms rotate in a counter-clockwise direction. The arcuate contacts 128, 129 of the deck K are connected together and to the bridge junction a, and the associated contact arm 126 is connected to the lead 95, which lead is connected to one terminal of the rocket 80. Consequently, the thermistor associated with the connector plug 16 is connected to the bridge junctions a and b when the contact arm 126 is in sliding engagement with either of the associated arcuate contacts 128 and 129. The engagement of the contact arm 125, deck L, with the associated arcuate contact 131 is of no effect as such arcuate contact is dead. The contact arm 124, deck M and the associated arcuate contact 132 are connected, respectively, to the movable contact and the active fixed contacts of deck D of the manually-operable switch. Thus, the bridge resistor 98 is connected to the bridge junctions b and c when the contact arm 124 is in sliding engagement with its arcuate contact 132, thereby completing the bridge circuit. A lead 134 connects the contact arm 123, deck N, to the lead 109, and arcuate contact 133, of deck N, is connected to the current-limiting resistor 108 by the lead 135. Consequently, when the contact arm 123 is in sliding engagement with its associated arcuate contact 133, the instrument movable coil 102, the recorder movable coil 104 and the current-limiting resistor are connected in series across the bridge output junctions b and d. It will now be apparent that during the first one-half revolution of the sequencing switch, the temperature of the R probe will be indicated by the instrument 76 and, simultaneously, such temperature will be recorded in the form of a dot marked on the recorder chart.

During the second one-half revolution of the sequencing switch, the contact arm 126, deck K, is in sliding engagement with the associated arcuate contact 129, whereby the thermistor connected with the connector plug 16 remains connected between the bridge junctions a and b. Now, however, the bridge resistor 98 is replaced by the thermistor connected to the L connector plug 15, the circuit being traced as follows, lead 110 connected to one side of the thermistor through the contacts of the socket 79 and the connector plug 15, leads 111 and 137, contact arm 125 engaging the associated arcuate contact 138, lead 139, contact arm 124 engaging the associated arcuate contact 140, and the leads 141 and 97. At the same time, the disengagement of the contact arm 123, deck N, from its associated arcuate contact 133 removes the current-limiting resistor 108 from the bridge output circuit, whereby the bridge output voltage is applied directly to the series-connected movable coils 102 and 104, the circuit being traced as follows; lead 107, movable coils 102 and 104, leads 120 and 142, contact arm 123 engaging the associated arcuate contact 143, and the leads 134 and 109. Consequently, during the second one-half revolution of the sequencing switch, the two probes form two adjacent arms of the bridge and the temperature difference between the probes is indicated by the instrument 76 and recorded on the chart.

In order to record the base temperature of the R probe and the difference temperature on proper zones of the recorder chart, the operator draws the chart downwardly until the beginning of the chart zone 88 underlies the printing station of the recorder, after which the operator sets the knob 81 to the AUTO. position. As long as the knob 81 remains in this position, the recorder will print 10 dots on chart zone 88 (each dot corresponding to the temperature of R probe) and then 10 dots on the chart zone 89 (each dot corresponding to the difference in temperature between the two probes.) Such alternate recording of these temperatures will continue until the knob 81 is set to any one of its other three positions, whereby the opening of the contacts of deck F results in the deenergization of the recorder motor 121 and the sequencing switch motor 122. When the temperatures are to be recorded, as above described, the discs of the sensing probes are attached to selected areas of the subject being tested, as by means of a pressure-sensitive tape.

The apparatus shown in FIGS. 7 and 8 is particularly adapted for measuring and recording the temperatures of female breasts on a mass survey basis. To facilitate the making of such measurements the thermistors are imbedded in a truncated cup-shaped device as shown in FIGS. 9 and 10. Here, four thermistors 145-148 are embedded in a cup-shaped member 149 made of a soft, pliable material. The thermistors are connected in series-parallel by flexible wires terminating in a connector plug 150 and are positioned for contact with the skin of the subject to be tested. By connecting the four thermistors in a series-parallel arrangement, their total nominal resistance will be the same as that of a single-thermistor probe, whereby the device can be plug-connected into the bridge circuit of FIG. 3 or FIG. 8 in place of the illustrated single thermistor probes without effecting the integrity of the instrument indications. In use, the total resistance of the thermistors will vary in correspondence with the average temperature of the four quadrants of the breast. A similar device, is provided for attachment to the other breast and includes a connector plug marked R, and the two cup-shaped devices can be plug-connected to the instrument shown in FIG. 7.

FIG. 11 is a diagrammatic representation of an arrangement for making mass temperature checks and records. The reference numerals 1–8 identify individual compartments, each compartment being provided with a pair of cup-shaped devices 152 and 153 similar to that shown in FIGS. 9 and 10. In this case, however, the flexible leads extending from each of the devices 152 and 153 are connected to a selector switch 154 which is manually operable by an operator sitting at a table 155. The temperature indicating device 77 and the recorder 83 (see also FIG. 7) also are positioned on the table. The subjects to be tested enter the compartments at random and apply the devices 152 and 153 to the breasts. The operator then selects a particular compartment by setting the selector switch 154 to the corresponding number. By means of appropriate circuitry, the particular devices 152 and 153 are connected into the bridge circuit and, at the same time, a light 151 is energized, thereby indicating to the subject that temperature measurements are now being made. The operator now sets the knob 81 (see also FIG. 7) to the R, L or DIFF. position, thereby to obtain a quick measurement of the average temperature of each breast and the difference in the average temperatures of both breasts. By setting the knob 81 to the AUTO. position the average temperature of one breast and the temperature difference between the two breasts are recorded on the corresponding zones of the recorder chart. When a desired number of such temperature recordings have been made, the operator sets the selector switch 154 to the zero position, whereby the signal light is deenergized to indicate the tests on this particular subject have been completed. A difference in the average temperature of the breasts may be indicative of disease located in the breast having a significantly higher or lower temperature than the normal, or base, temperature.

The truncated cup-shaped device shown in FIGS. 12 and 13 is particularly adopted for locating a breast area having an abnormal temperature. Here, the cup-shaped member 156 carries the two thermistors 157 and 158 individually connected to the connector plugs 159 and 160 provided with identification markings 1 and 2, respectively. The outer surface of the member 156 preferable also carries the corresponding markings 1 and 2. The thermistors are spaced apart 90°, whereby the base temperature and the difference temperature may be measured on breast areas lying in adjacent quadrants.

Figure 15:
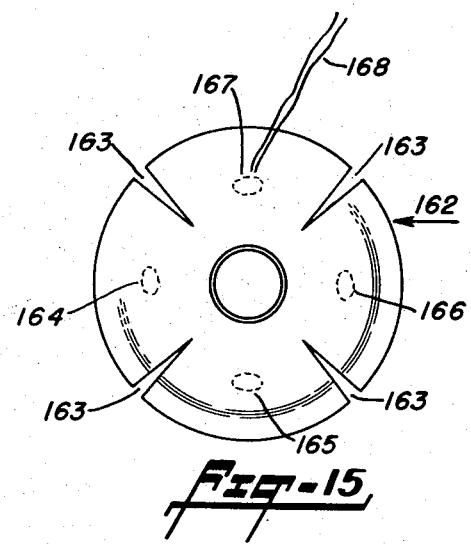

A modified construction of the cup-shaped device is shown in the side and front elevational views of FIGS. 14 and 15, respectively. The cup-shaped member 162, provided with four, narrow, longitudinally-extending slots 163, is made of a suitable, soft plastic material which tends to retain the normal contracted configuration, as shown. The slots permit an expansion of the base portion of the member 162 for the purpose of positioning the device on a breast. Four thermistors 164–167 are embedded in the member 162 at the inner surface thereof, which thermistors may be connected together in a series-parallel arrangement as described hereinabove with reference to FIGS. 9 and 10. Alternatively, each thermistor may be connected to individual leads passing outwardly of the member 162 as, for example, the leads 168 connected to the thermistor 167.

Figure 16:
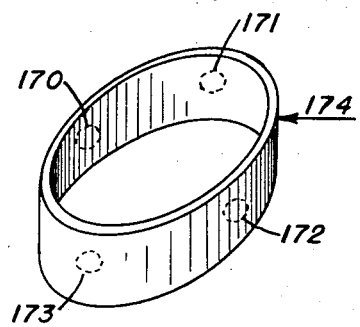
FIG. 16 is an isometric view showing another arrangement for supporting the temperature-sensitive elements.

FIG. 16 illustrates another form of the device for supporting the temperature-sensitive elements in operative position on a breast or other member of the body. Here, the thermistors 170–173 are embedded in a garter band 174 made of an elastic textile material.

Figure 17:
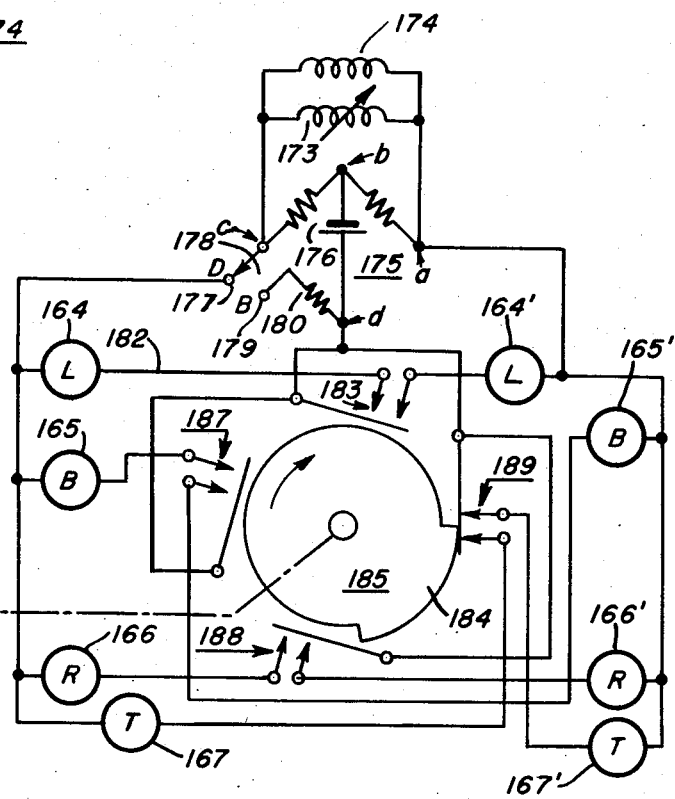
FIG. 17 is a circuit diagram of simplified apparatus for measuring and recording base temperature and differential temperature.

Reference now is made to FIG. 17 which illustrates a simplified arrangement for measuring and recording the individual base temperatures of a plurality of selected areas of the body as well as the temperature difference between corresponding body areas. The movable coil 173 of the indicating instrument and the movable coil 174 of the recorder are connected across the output junctions $a$ and $c$ of the bridge 175 energized by the battery 176. One set of four thermistors 164–167 may correspond to the similarly-identified thermistors shown in FIG. 15 and carried by the cup-shaped member 162. In FIG. 17, these thermistors also are marked with the letters L, B, R and T corresponding to the Left, Bottom, Right and Top quadrants of a breast to which the cup-shaped member is attached. A second, similar set of four thermistors $164' - 167'$ are carried by a similar cup-shaped member attached to the other breast. One end of each of the thermistors 164–167 is connected to a fixed contact 177 of a manually-operable, two position switch 178 having a movable contact connected to the bridge junction $c$. The other fixed contact 179, of this switch, is connected to the bridge resistor 180. Thus, when the movable contact of the switch is transferred into engagement with the fixed contact 179 the resistor 180 forms a bridge arm connected across the junctions $c$ and $d$. When the switch 178 is in the illustrated position, the resistor 180 is replaced by one of the thermistors 164–167 as will be described below.

The thermistor 164 is connected, by the lead 182, to one of the fixed contacts of a normally-open cam switch 183 having a flexible contact arm projecting into the path of travel of a lobe 184 of the cam 185 which is coupled to the drive shaft of a motor 186. The other thermistors 165–167 are individually connected to one of the fixed contacts of the similar cam switches 187, 188 and 189. One end of each of the thermistors $164' - 167'$ is connected to the bridge junction a, and the other ends of these thermistors are individually connected to the other fixed contacts of the cam switches 183, 187, 188 and 189, respectively. All of the flexible contacts of the cam switches are connected together and to the bridge junction d. Upon closure of the line switch 190, the motor 186 rotates the cam 185 at, say, 2 R.P.M., and the cam lobe closes and opens the cam switches in sequence. As illustrated, the cam switch 189 is closed, thereby connecting the thermistor 167' across the bridge junctions $a$ and $d$ and, at the same time, connecting the corresponding thermistor 167 across the bridge junctions $c$ and $d$. Under this condition, the temperature difference between the Top quadrants of each breast will be measured and recorded. The angular extent of the cam lobe is somewhat less than 90°, so a succeeding cam switch is closed after the preceding cam switch has been opened. Upon closure of the cam switch 188, the thermistor 166' is connected across the bridge junctions a and d, and the corresponding thermistor 166 is connected across the bridge junction $c$ and $d$. Under this condition, the temperature difference between the Right quadrants of each breast will be measured and recorded. It will be apparent the apparatus will continue to measure and record the temperature difference between like quadrants of the breasts as long as the line switch 190 is closed and the two-position switch 178 is set to the illustrated D (Differential) position. When desired, the operator may set the switch 178 to the B (Base) position, whereby the apparatus will measure and record, in sequence the base temperature of each quadrant of that breast to which the thermistors 164' – 167' are attached.

The operation of the apparatus shown in FIG. 17 has been described with specific reference to two sets of thermistors carried by cup-shaped members for attachment to the breasts. It will be apparent however, that any number of thermistors may be divided into two sets and the individual thermistors may be attached to selected body areas as by means of a pressure-sensitive tape.

Having now described the invention what I desire to protect by Letters Patent is set forth in the following claims.

1. Thermographic apparatus for medical diagnosis comprising,
   a. a pair of temperature-sensitive elements,
   b. a resistance bridge having input and output junctions one arm of the bridge comprising a resistor connected across a first pair of adjacent bridge junctions through a normally-closed switch,
   c. a d.c. voltage source,
   d. means connecting the voltage source across the bridge input junctions,
   e. first connection means for connecting one of the temperature-sensitive elements across a second pair of adjacent bridge junctions,
   f. second connection means for connecting the other temperature-sensitive element across the said first set of adjacent bridge junctions,
   g. actuating means for opening the said switch to thereby disconnect the said resistor from the said first pair of adjacent bridge junctions, and
   h. a strip chart recorder connected to the bridge output junctions, said recorder having a chart divided alternately into two zones, one zone being marked in increasing temperature values over a predetermined temperature range, and the other zone being marked in increasing temperature values to either side of a common zero reference point.

2. The invention as recited in claim 1, wherein the said temperature-sensitive elements are carried by a cup-shaped member having a truncated apex and made of a soft, pliable material.

3. The invention as recited in claim 2, wherein the said cup-shaped member is provided with a plurality of slots extending from the base portion thereof.

4. The invention as recited in claim 1, wherein the temperature-sensitive elements are carried by a band made of a soft, stretchable material.

5. Thermographic apparatus for medical diagnosis comprising,
   a. a resistance bridge having two resistors forming two bridge arms and a third resistor connectable across a first pair of adjacent bridge junctions to form a third bridge arm,
   b. a d.c. voltage source connected to the bridge input junctions,
   c. an electrical instrument connected to the bridge output junctions, and having a scale calibrated in temperature values,
   d. a manually-operable switch settable to a first a second and a third position,
   e. a pair of temperature-sensitive resistance elements,
   f. circuit elements connecting said third resistor across the first pair of adjacent bridge junctions and simultaneously connecting one of the resistance elements across a second pair of adjacent bridge junctions, to form a fourth bridge arm when the said switch is set to the first position,
   g. circuit elements connecting the said one of the resistance elements across the second pair of adjacent bridge terminals, connecting the other of the resistance elements across the said first pair of adjacent bridge junctions and disconnecting the said third resistor from the first pair of bridge junctions when the said switch is set to the second position,
   h. sequencing switching means and having first and second sets of contacts which are alternately closed and open-ed when the switching means is actuated,
   i. means actuating the switching means when the said switch is set to the third position,
   j. circuit elements connecting the said third resistor to the said first pair of adjacent bridge junctions and simultaneously connecting the one resistance element to a second pair of adjacent bridge junctions when the switching means closes its first set of contacts, and
   k. circuit elements connecting the said one of the resistance elements of the second pair of adjacent bridge junctions, connecting the other of the resistance elements to the said first pair of adjacent bridge junctions and disconnecting the said third resistor from the first pair of adjacent bridge junctions when the switching means closes its second set of contacts.

6. Thermographic apparatus for medical diagnosis comprising,
   a. a case carrying a first electrical instrument having a movable coil and a scale calibrated in increasing temperature values and a second electrical instrument having a movable coil and a scale calibrated in temperature values which increase to either side of a zero reference mark,
   b. a resistance bridge in the case and having input junctions connected to a d.c. voltage source, one arm of the bridge being a resistor normally connected across a first pair of adjacent bridge junctions,
   c. a first temperature-sensitive resistance element carried by a handle member and connected across a second pair of adjacent bridge junctions,
   d. means mounting the handle member for retraction into the case,
   e. a second temperature-sensitive resistance element connected to a connector plug insertable into a socket carried by the case, which socket has a pair of terminals,
   f. a manually-operable switch carried by the case, said switch having first and second sets of normally-closed contacts and first and second sets of normally-open contacts, the said first set of normally-closed contacts being the contacts which normally connect the said resistor across the bridge junction, g. circuit elements connecting the movable coil of said first instrument to the bridge output junctions through the said second set of normally-closed contacts, h. circuit elements connecting the terminals of the said socket across the said first pair of adjacent bridge junctions through the said first set of normally-open contacts, and i. circuit elements connecting the movable coil of the second instrument through the said second set of normally-open contacts.

7. A cup-shaped member made of a soft material and having a truncated apex, a temperature-sensitive element carried by said member and positioned at the inner surface thereof, and leads connected to said element and extending externally of the said member.

8. The invention as recited in claim 7, wherein the said cup-shaped member is provided with a plurality of longitudinally-extending slots extending from the base portion thereof.

9. Thermographic apparatus for medical diagnosis based upon temperature measurements made on two areas of a human body and comprising, a. a plurality of compartments for accommodating a plurality of individuals to be diagnosed, b. a supporting member disposed within each of the compartments and adapted for attachment to a predetermined body member, c. at least one temperature-sensitive element carried by each of the supporting members and adapted to engage a relatively small area of the body to which a support-ing member is attached, d. a resistance bridge circuit having a source of d.c. voltage connected to its input junctions, e. read-out means responsive to the output voltage of this bridge circuit and having a scale calibrated in temperature values, and f. circuit elements for connecting a selected resistance element into the bridge circuit so that the bridge output voltage varies in correspondence with the temperature of the selected resistance element.

10. The invention as recited in claim 9, including an additional supporting member disposed within each of the compartments and adapted for attachment to a similar body member, at least one temperature-sensitive resistance element carried by each of the additional supporting members, and circuit elements for connecting the resistance elements carried by the two supporting members disposed in a particular compartment into adjacent arms of the bridge circuit so that the bridge output voltage varies in correspondence with the difference in temperature between such resistance elements.

11. The invention as recited in claim 10, wherein all of the supporting members are of cup-shape adapted for attachment to a female breast.

* * * * *